Oct. 16, 1928.
1,687,545
W. J. CLEMENTS
SPRAYING DEVICE
Filed Oct. 11, 1926
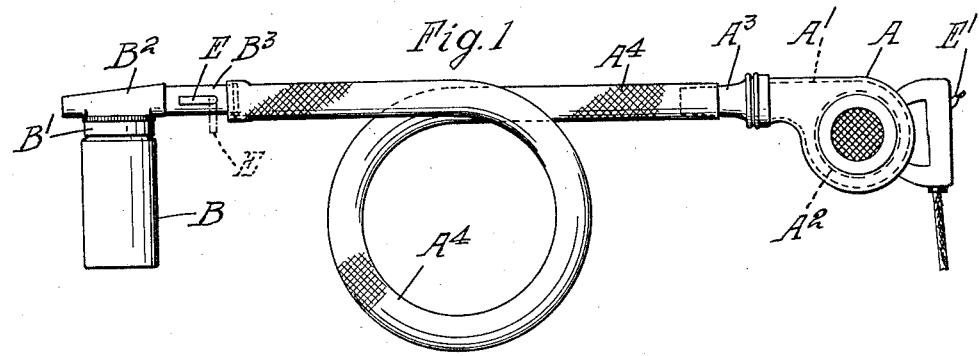
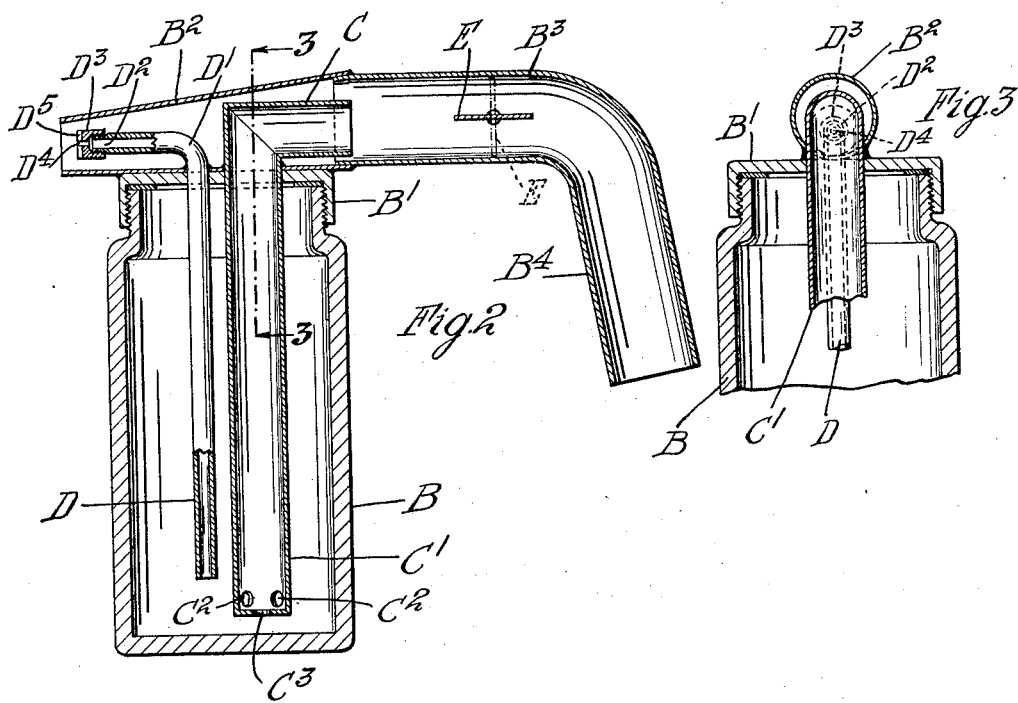
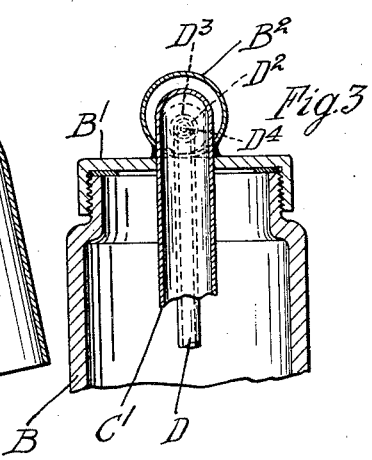
Inventor
William J. Clements
by Parker & Carter
Attorneys.

Patented Oct. 16, 1928.

1,687,545

UNITED STATES PATENT OFFICE.

WILLIAM J. CLEMENTS, OF CHICAGO, ILLINOIS, ASSIGNOR TO CLEMENTS MFG. CO., OF CHICAGO, ILLINOIS, A CORPORATION OF ILLINOIS.

SPRAYING DEVICE.

Application filed October 11, 1926. Serial No 140,793.

My invention relates to a spraying device and has for one object the provision of a spraying device which is equally operative for the spraying of a liquid or a finely divided solid. Another object is the provision of a sprayer adapted to spray finely divided solids, in association with means for agitating said solids to permit their ready feed through the sprayer. Another object is the provision of a spraying device adaptable for use with a relatively low pressure blower. Other objects will appear from time to time in the course of the specification and claims.

I illustrate my invention more or less diagrammatically in the accompanying drawings, wherein Figure 1 is a side elevation of my spraying device in connection with a blower;

Figure 2 is a longitudinal section; and

Figure 3 is a section along the line 3—3 of Figure 2.

Like parts are indicated by like reference symbols throughout the specification and drawings.

A generally indicates any source of pressure and, in the present case, a blower including the fan chamber $A^1$ and the motor chamber $A^2$ and the blowing nozzle $A^3$. $A^4$ indicates a flexible conduit.

B is a container adapted to contain a liquid or a finely divided solid. It is herein shown as provided with a removable cover $B^1$, to which is secured the outer nozzle member $B^2$. $B^3$ is a passage in communication therewith, adapted to receive the flexible conduit $A^4$. It may be downwardly bent to form the pistol grip $B^4$.

C is an elbow within the outer nozzle, which continues through the cover $B^1$ and communicates with the passage member $C^1$, which extends substantially to the bottom of the container. The passage member is herein shown as provided at its bottom with a plurality of lateral apertures $C^2$ and one or more bottom apertures $C^3$. It will be realized, however, that the size, number and location of these apertures may be widely varied, to suit the particular substance to be sprayed.

D is an outlet or spraying passage extending from adjacent the bottom of the container to and through the cover. It is continued by the elbow $D^1$ and terminates in the discharge nozzle $D^2$ within and generally concentric with the outer nozzle. It is herein shown as employed with a removable tip member $D^3$ with the central aperture $D^4$ and the slot $D^5$ whereby it may be screwed into place.

E indicates any suitable control valve whereby the pressure or passage of air into the nozzle may be regulated, and $E^1$ generally indicates an electric switch whereby the operation of the blower may be regulated.

It will be realized that whereas I have shown a practical and operative device, nevertheless many changes may be made in size, shape, number and disposition of parts without departing from the spirit of my invention. I therefore wish my drawings and description to be taken as in a broad sense illustrative or diagrammatic rather than as limiting me to the specific disclosure of my device herein made.

The use and operation of my invention are as follows:

Liquids and solids are in current industrial processes frequently sprayed, but the prevailing methods are in the main either clumsy and inefficient or else expensive and calling for cumbersome and expensive machinery. I provide a spraying device which is cheap and easy to manufacture, and which may be removably attached to a simple portable blowing device, and which is equally adaptable to spray liquids or finely divided solids.

I find that my device is particularly adaptable to the spraying of powders, or of liquids wherein finely divided material is in suspension and tends to precipitate. However, the sprayer works equally well with liquids and is particularly well adapted for the general uses to which such a sprayer is likely to be put when supplied as part of the attachments for a vacuum cleaner or blower sold for example for domestic use.

I provide a container for the liquid and solid, and I find it convenient to associate with such container a removable lid to which the nozzle is secured, although I do not wish to be limited to any such arrangement. I may connect the nozzles, for example by means of a flexible conduit $A^4$, with the simple portable blower. A substantial portion of the air delivered by the blower passes through the nozzle but a portion of the air is intercepted by the upwardly projecting elbow and therefore builds up pressure in or promotes a circulation of air through the container. When the blower is actuated and the air rushes into the container through the elbow, a corresponding flow of air is maintained upwardly and outwardly through the small discharge passage. This discharge passage, and its removable tip, discharges the material to be sprayed in the center of a blast of air delivered by the outer nozzle. It is thus guided, directed and reinforced by the outer envelope of air. The circulation of air through the container and the withdrawal of the material therein is also promoted by the suction exerted by the passage of the air about the discharge tip.

An important feature of my device, particularly where it is employed with a finely divided solid, for example in spraying powders, or when it is employed in spraying a mixed liquid, rests in the fact that the air inlet passages are so disposed as to create turbulence within the container. The powder is scattered and packing is prevented, and a circulation of the powdered material is promoted, so that the powder will be fed and sprayed as easily as a liquid. If a mixed liquid, for example a liquid with a finely divided pigment, is employed, the separate air passages serve as agitating means to maintain a generally uniform mix.

I claim:

1. A spraying attachment for use with portable blowers and adapted for use with both powders and liquids, which includes a container for the material to be sprayed, a removable cap or cover member dapted to be secured thereto, said cover member having associated therewith an air nozzle member, tapering toward the delivery end, an air conduit associated with said nozzle member and adapted to serve as a handle, and terminating at the opposite end in a portion adapted to receive a flexible tube, a valve in said air conduit, an air inlet passage member having its inlet opening positioned within said nozzle and opening toward said handle member, and extending downwardly into said container to a level closely adjacent the bottom of said container, the bottom thereof being closed, an outlet member extending downwardly from said nozzle into said container and terminating, at its upper end, within said nozzle, the cross-sectional area of the air inlet passage being substantially greater than that of the outlet member, the air inlet member being provided with a plurality of apertures at its lower end.

2. A spraying attachment for use with portable blowers, and adapted for use with liquids and solids, which includes a container for the material to be sprayed, a removable cap or cover member, adapted to be secured thereto, said cover member having associated therewith an air nozzle member, an air conduit associated with said nozzle member, said conduit terminating at its opposite end in a portion adapted to receive the end of a flexible tube, such end portion being downwardly turned in relation to said nozzle, such downwardly turned portion being adapted to serve as a handle, a valve in said air conduit, an air inlet passage member having its inlet opening positioned within said nozzle and opening toward said handle member, and extending downwardly into said container to a level closely adjacent the bottom of said container, an outlet member extending downwardly from said nozzle into said container and terminating, at its upper end, within said nozzle, the cross sectional area of the air inlet passage being substantially greater than that of the outlet member.

Signed at Chicago, county of Cook, and State of Illinois, this sixth day of October, 1926.

WILLIAM J. CLEMENTS.